(12) United States Patent
Pignorel et al.

(10) Patent No.: US 11,073,936 B2
(45) Date of Patent: Jul. 27, 2021

(54) INTERACTIVE POSTER

(71) Applicant: NXP B.V., Eindhoven (NL)

(72) Inventors: Arnaud Pignorel, Verson (FR); Nguyen Trieu Luan Le, Cormelles le Royal (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/544,223

(22) Filed: Aug. 19, 2019

(65) Prior Publication Data

US 2020/0379622 A1 Dec. 3, 2020

(30) Foreign Application Priority Data

Jun. 3, 2019 (EP) .................................... 19305705

(51) Int. Cl.
*G06F 3/041* (2006.01)
*H04B 5/00* (2006.01)
*H01Q 1/22* (2006.01)

(52) U.S. Cl.
CPC ....... *G06F 3/04162* (2019.05); *H04B 5/0037* (2013.01); *H01Q 1/2225* (2013.01)

(58) Field of Classification Search
CPC .. G06F 3/04162; H04B 5/0037; H01Q 1/2225
See application file for complete search history.

(56) References Cited

U.S. PATENT DOCUMENTS

| 8,565,791 B1 | 10/2013 | Schilit et al. |
| 8,593,255 B2 | 11/2013 | Pang et al. |
| 8,750,514 B2 | 6/2014 | Gallo et al. |
| 8,849,705 B2 | 9/2014 | Khan et al. |
| 9,088,862 B2 | 7/2015 | Jalkanen et al. |
| 2010/0161410 A1 | 6/2010 | Tulloch |
| 2010/0216396 A1* | 8/2010 | Fernandez ......... G06Q 20/3223 455/41.1 |
| 2010/0271177 A1* | 10/2010 | Pang ....................... H04L 67/36 340/10.1 |
| 2011/0320293 A1 | 12/2011 | Khan |
| 2012/0218082 A1* | 8/2012 | Deluca .............. H04M 1/72445 340/10.1 |
| 2013/0179306 A1* | 7/2013 | Want .................. G06Q 20/3278 705/26.81 |
| 2014/0191988 A1* | 7/2014 | Corrion ............. G06F 3/041661 345/173 |

FOREIGN PATENT DOCUMENTS

| CN | 202383751 U | 8/2012 |
| WO | 2013095410 A1 | 6/2013 |

OTHER PUBLICATIONS

R. Hardy et al., "Mobile Interaction with Static and Dynamic NFC-based Displays", MobileHCI '10 Proceedings of the 12th international conference on Human computer interaction with mobile devices and services, pp. 123-132. (Lisbon, Portugual—Sep. 7-10, 2010).

* cited by examiner

*Primary Examiner* — Thomas D Alunkal

(57) ABSTRACT

An interactive poster includes one or more first near-field communications (NFC) antennas, a memory to store first content, and a controller control operation of a display. The NFC antennas may be located at predetermined positions, and the controller changes display of first content to second content when one or more of the antennas are tapped by a user device including an NFC circuit.

21 Claims, 7 Drawing Sheets

MULTIPLE ANTENNAE
TAPPING

SINGLE ANTENNA
TAPPING

INTERACTIVE POSTER

This application is based upon and claims the benefit of priority from prior European Patent Application No. 19305705.6, filed Jun. 3, 2019, which is hereby incorporated by reference for all purposes as if fully set forth herein.

TECHNICAL FIELD

Example embodiments disclosed herein relate to controlling the display of information.

BACKGROUND

Efforts are continually being made to develop new ways of displaying information. One way involves using an interactive poster. One type of interactive poster includes a display with a near-field communications (NFC) tag. The tag includes a link to a remote server that stores specific content, e.g., audio file, video file, advertisement information, retail information, etc. When a user brings his smartphone within range of the tag, an internal NFC circuit reads the link from the tag and a controller in the smartphone accesses the content from the server for display.

An interactive poster of this type is considered to be static, in that the displayed content does not change. Thus, the viewer has no control over the information that is displayed on the poster. Also, the only action a viewer can perform in relation to the poster is to read information from the tag. This limits the usefulness of the poster. Moreover, a specific infrastructure must be provided to connect the poster to a remote server containing the data to be accessed. Also, a dedicated application for the NFC reader is required to be used on the smartphone, all of which are costly and inconvenient.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

In accordance with one or more embodiments, an interactive poster includes a first near-field communications (NFC) antenna, a first memory to store first content, and a controller to control operation of a display, wherein the first NFC antenna is located at a first position that corresponds to display of first content and wherein the controller changes display of the first content to second content when the first NFC antenna is tapped by a user device including an NFC circuit. The first content may be a first type of media data and the second content may be a second type of media data different from the first type of media data. The first and second types of media data may be selected from the group consisting of text data, image data, video data, graphics data, and animation data.

The interactive poster may include a second NFC antenna at a second position corresponding to the first content. In this case, the controller may change display of the first content to the second content when the first and second NFC antennas are simultaneously tapped by the user device. In one embodiment, the interactive poster may include a second NFC antenna at a second position corresponding to third content, where the controller may change display of the third content to fourth content when the second NFC antenna is tapped by the user device. The controller may display the first content and the third content simultaneously. The controller may display the second content and the fourth content at different times.

The interactive poster may include a first power detector to generate a first detection signal when the first NFC antenna is tapped and a second power detector to generate a second detection signal when the second NFC antenna is tapped, wherein the controller may control display of the second content based on the first detection signal and to control display of the fourth content based on the second detection signal.

The interactive poster may include a second memory to store information linking the first content and the second content, wherein the controller may access the information to change display of the second content when the first NFC antenna is tapped by the user device. The interactive poster may include a power harvester to output power for the controller based on energy received by the first NFC antenna from the NFC circuit of the user device.

The interactive poster may include a second NFC antenna at a second position corresponding to display of the first content, wherein the first NFC antenna may be in an active state and the second NFC antenna may be in an inactive state. The controller may change the first NFC antenna to an inactive state or the second NFC antenna to an active state when the first NFC antenna is tapped by the user device. The second NFC antenna may correspond to display of third content when the second NFC antenna is in the active state. The display may be a e-paper display.

In accordance with one or more embodiments, an interactive poster includes a first memory area configured to store instructions and a controller to control a display based on the instructions, wherein the controller changes display of first content to second content based on a signal generated when a first near-field communications (NFC) antenna is tapped with a user device including an NFC circuit, the controller to change display of the first content to the second content based on information linking the first NFC antenna to a first selectable area of the first content. The first content may be a first type of media data and the second content may be a second type of media data different from the first type of media data, the first and second types of media data selected from the group consisting of text data, image data, video data, graphics data, and animation data.

The controller may change display of the first content to third content based on a signal generated when a second NFC antenna is tapped with the user device, the controller to change display of the first content to the third content based on information linking the second NFC antenna to a second selectable area of the first content. The controller may change display of the first content to the second content when the first NFC antenna and a second NFC antenna corresponding to the display are tapped simultaneously by the user device. The controller may change a state of the first NFC antenna when the first NFC antenna is tapped by the user device.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

Figure 1:
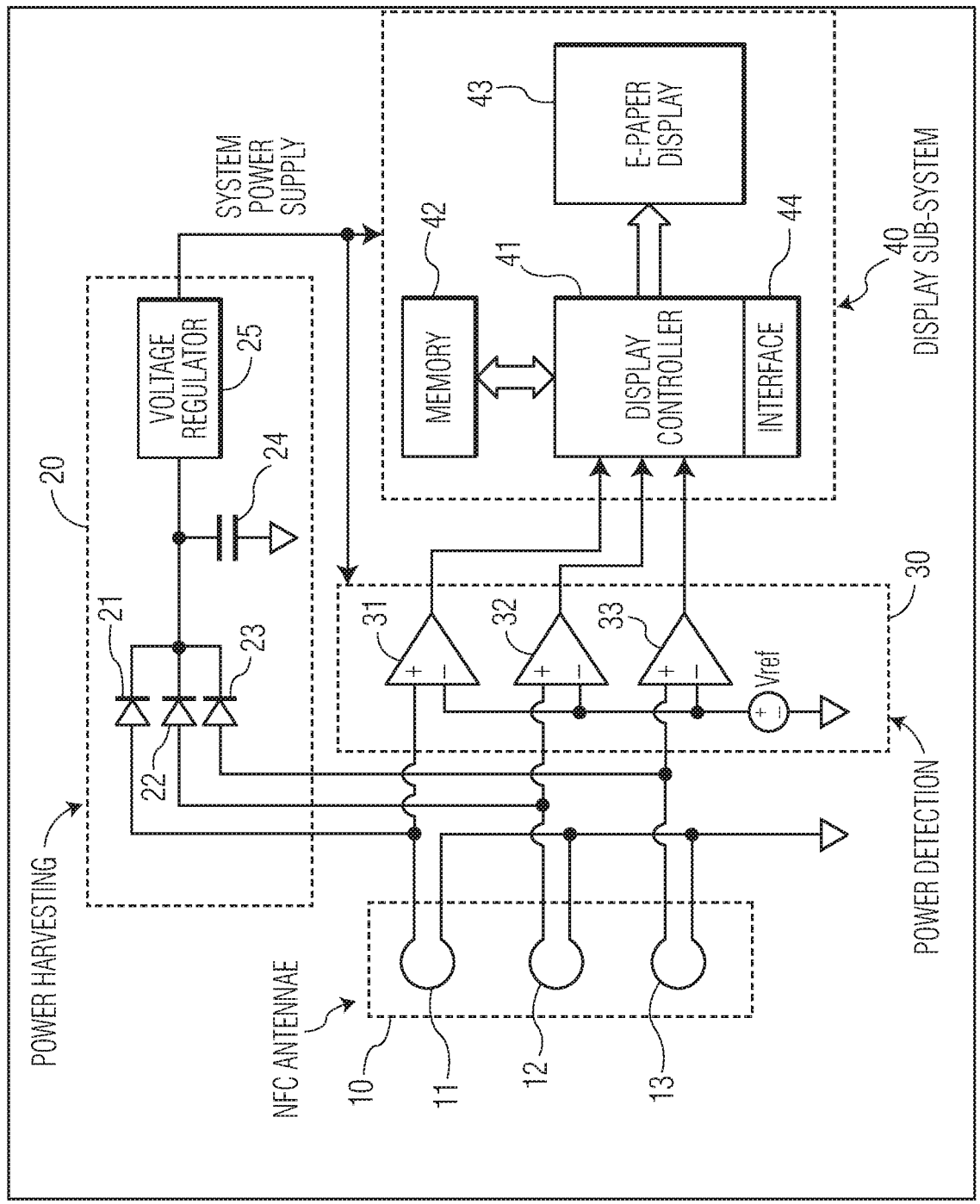
FIG. 1 illustrates an embodiment of an interactive poster.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

In accordance with one or more embodiments, an interactive poster dynamically displays information. In one embodiment, information displayed on the poster may change when a user device including an NFC circuit comes within range of (e.g., "taps") one or more antennas. For example, when the NFC circuit comes taps an antenna, content displayed on the poster may be presented or changed in order to display different content relevant to and/or of particular interest to the user. Thus, the user may control and change information displayed on the poster, which makes the poster dynamic in nature.

In one embodiment, specific actions may be triggered when multiple antennas are tapped at the same time. This may significantly increase the number of associated actions performed by the poster. For example, tapping one or more of the antenna corresponding to displayed content may trigger display of different information, which causes one or more antennas to become active that were previously inactive, or vice versa. In one embodiment, the poster may operate based solely on power derived from the NFC circuit of the user device, thereby alleviating the need for a separate or expanded capacity power source for the poster.

FIG. 1 illustrates an embodiment of an interactive display device which dynamically displays information. A user may control the information to be displayed (or change the information that is displayed) by "tapping" an area on the display device with a device (e.g., a smartphone) which includes an NFC circuit. In one embodiment, the terms "tapping" and "tap" include physical contact between the user device and a surface of the display device with one or more corresponding antennas or bringing the user device to within NFC range of the surface of the display device including one or more antennas without actual physical contact. When the user device taps various "selectable" areas of the display device that includes one or more antennas, an electric field induced between the NFC circuit in the user device and the antennas to power the display device and effect a change in the displayed content. (In accordance with one or more embodiments, the interactive display device may be referred to as an interactive poster, although the term "poster" should not be construed to limit the type or use of the display device and/or its applications.)

Referring to FIG. 1, the interactive display device includes a receiver 10, a power harvester 20, a power detection section 30, and a display sub-system 40. The receiver 10 includes one or more antennas at predetermined locations relative to the display surface of the device. In this example, the receiver 10 is illustrated to include three antennas 11, 12, and 13, but a different number of antennas may be included in another embodiment. The distance between the NFC circuit in the user device and each of the antennas determines whether or not power is exchanged between the user device and the display device and whether one or more operations (e.g., change of content, performance of an operation, etc.) are performed. The reception range of each antenna may be determined by a standard or protocol governing near-field communications. While NFC communications is discussed in this embodiment, the user device and display device may operate based on a different type of short-range communication standard or protocol in another embodiment.

The locations of the antennas relative to the display surface may be determined without consideration of the content being displayed. However, the operational state of one or more of those antennas may be determined based on the content being displayed in some embodiments. For example, in one embodiment, the locations of one or more of the antennas may be configured based on the displayed content and the locations of one or more other antennas may be configured independent from the displayed content. The spacing between the antennas may also be content-independent and/or content-dependent. As will be explained in greater detail below, in one embodiment, the NFC circuit of the user device may come within range (e.g., "tap") two or more antennas at the same time, in order to prompt the display of certain associated information and/or perform one or more predetermined operations.

The power harvester 20 receives power from the user device based on interaction between the one or more of the antennas and the NFC circuit in the user device. For example, when the NFC circuit (e.g., NFC reader) is brought within range of one of the NFC antennas, electrical power is generated at the output of the antenna by an electric field from the NFC reader, e.g., much in the same way power is transferred between the coils of a transformer. The power harvester 20 collects this power and converts it to supply power to operate the display sub-system and/or other circuits and operations of the interactive display device.

In one embodiment, the power harvester 20 may output power for the entire operation of the interactive poster including the power detector, the memory, the display controller, and any power required by the display. The operations of the display device may therefore performed based solely on power from the user device, although in other embodiments an additional power source may be used, for example, based on the type of display.

The field radiation pattern of an NFC reader may be relatively large due to the use of an inductive antenna. When the antennas are closely spaced, multiple ones of the antennas may receive a substantially high level of power as soon as the NFC reader is placed within range of these antennas. A set of antennas may be considered to be tapped simultaneously when the level of received power of each antenna of the set exceeds the defined threshold. The distance between the individual antennas may define whether only single antenna tap (large antenna separation) or multiple antennae tap (short antenna separation) has occurred.

In one embodiment, the power harvester 20 may include a number of switches 21, 22, and 23, a filter 24, and a voltage regulator 25. The number of switches may correspond, for example, to the number of antennas, e.g., the switches 21, 22, and 23 may be in one-to-one correspondence with the antennas 11, 12, and 13. In one embodiment, the switches 21, 22, and 23 may be diodes with forward bias (or threshold) voltages tuned to pass a certain level of input power. When a user device taps the display surface of the poster within range of antenna 11, the NFC circuit in the user device transfers power to antenna 11. This power is transferred to the power harvester to forward bias diode 21. The power is filtered (e.g., low-pass filtered) by capacitor C1 of filter 24 and then input into the voltage regulator 25. In one embodiment, the capacitor C1 may perform voltage ripple filtering, which may involve, for example, smoothing the RF alternating signal received at the antenna to provide a quasi-DC voltage. The capacitor C1 may also serve as a power storage to deliver peak current to the circuits.

The voltage regulator may adjust the level of the voltage received from diode 21 to correspond to the level required by the display sub-system. A similar transfer of power may take place for the other antennas 12 and 13 relative to diodes 22 and 23. In one case, more than one antenna may receive power from the NFC circuit of the user device at the same time. In this case, more than one of the diodes may conduct to transfer combined power to the display sub-system and the power detection section 30 through the voltage regulator.

The power detection section 30 includes a plurality of differential amplifiers (e.g., comparators) 31, 32, and 33 to detect which antenna(s) have been tapped by the NFC circuit of the user device. (The comparators may be referred to as power detectors). Each comparator (or power detector) includes a first terminal coupled to first signal line of the antenna and a second terminal coupled to a reference voltage $V_{REF}$. In one embodiment, the polarities of these terminal may be interchangeable, e.g., non-inverting terminal coupled to the $1^{st}$ signal line or inverting terminal coupled to the $1^{st}$ signal line. A second signal line of the antenna is coupled to ground. When the NFC circuit of a user device comes within range of one of the antennas, the resulting electrical energy is input into a corresponding one of the comparators 31, 32, and 33. Each comparator may compare the voltage corresponding to the received electrical energy to a reference voltage. Based on this comparison (e.g., if the received voltage exceeds the reference voltage), the comparator outputs a signal to the display sub-system indicative of which antenna has been tapped.

Detecting which antenna(s) has been tapped may determine the function(s) to be performed by the display sub-system 40. This is because, for example, a tapped antenna may correspond to certain content being displayed at the time the tap is received and therefore tapping the antenna may be interpreted by the display sub-system as a request by the user to display additional, different, updated, or changed content and/or to perform certain operations. In this way, the user may have control over what information is to be interactively displayed on the display device, by tapping a user device in an appropriate "selectable" area on the display surface. In one embodiment, more than one of the comparators 31, 32, and 33 may simultaneously output detection signals, which may be interpreted to display content and/or perform certain operations corresponding to the detection signals.

The display sub-system 40 includes a controller 41, a memory 42, and a display 43. The controller 41 may receive the detection signals from the power detection section 30 and control display of content based on information stored in the memory 42. The controller 41 may be controlled to perform these and other operations based on, for example, instructions, routines, and/or programs stored in an internal memory which may be the same or different from memory 42. The memory 42 may store the content to be displayed on the display 43 and/or a link to retrieve the display content stored remotely from the display device. The content may include any combination of text, images, video, animations, graphics, webpages, audio, and/or other data. The content may be related to advertisements, entertainment, sports, health, weather, maps, and/or any other type of content that may correspond or otherwise be related to a theme of the interactive poster and/or its intended application(s) or purpose(s).

The display 43 may be any type of display. In one embodiment, the display may be a low-power display such as an electronic paper (e-paper) display. In other embodiments, the display may be an LED, OLED, LCD, or another type of display, but these displays may require a separate power source for operation. Predetermined "selectable" areas on the display may be associated with one or more of the antennas (e.g., 11, 12, and 13). For example, as previously discussed, the antennas may be placed at predetermined positions behind the display surface in order to interactively control a change of information displayed at one or more areas when tapped with a user device. All or a portion of the displayed information may be changed when tapped, depending, for example, on the purpose and/or type of content to be displayed in response to the tap.

In operation, the controller 41 receives a detection signal from one or more of the power detectors 31, 32, and/or 33 at different times or simultaneously. The detection signal from each power detector is linked to at least one associated operation and/or content to be displayed. For example, the controller 41 may control display of first content when the detection signal is received from power detector 31. The controller 41 may control display of second content when the detection signal is received from power detector 32. The controller 41 may perform a predetermined or programmed operation (e.g., change main image or theme of the interactive poster, initiate a sale or payment operation, redeem reward points, etc.) when the detection signal is received from power detector 33.

In one embodiment, other content may be displayed and/or other actions may be performed, for example, when detection signals are simultaneously received from one or more of the power detectors. This allows the controller 41 to display a greater range of content and/or to perform a greater range of operations. In one embodiment, one or several detection signals may not be used, e.g., may not be linked to any operation and/or content to be displayed.

The detection signals from the power detectors may be linked to respective content and/or operations by the instructions, routines, programs, and/or information stored in a memory area. The instructions, routines, programs and/or information may link various combinations of detection signals with predetermined changes in displayed content and/or operations. The controller 41 may access these instructions, information, etc., to control the display or the poster.

The following table provides examples of information that links detections signals to various operations and content to be displayed by the controller 41. In this table, Antennas 1, 2 and 3 may correspond, for example, to antennas 11, 12, and 13, respectively.

| Antenna(s) | Content/Operation(s) |
|---|---|
| Antenna 1 | Image 1 |
| Antenna 2 | Video 2 |
| Antenna 3 | Change Poster Theme |
| Antennas 1 & 2 | Image 2 and Text |
| Antennas 1 & 3 | Advertisement |
| Antennas 2 & 3 | Second-Level Content |
| Antennas 1, 2 & 3 | www.retailer.com |

In one embodiment, the display controller 41 may include or be coupled to an interface 44, which, for example, may establish a connection to a network. When the network is the internet, the linking information may associate a detection signal with a specific website. The controller 41 may access content from the website when the detection signal is received and then automatically display the accessed content. In one embodiment, the interface 44 may include or more of a Universal Serial Bus (USB) port or connection, a serial peripheral interface (SPI), or an inter-integrated circuit (I2C) interface with power lines to allow the content stored in the memory 42 to be updated or replaced.

In one embodiment, the detection signals from one or more of the power detectors may be linked to a private network, e.g., a virtual private network (VPN), a local area network of a business or company, or another type of network. In one embodiment, the network may be a telecommunications network which automatically places a call when a detection signal is received, in in order to allow a user of the interactive poster to communicate, for example, with emergency or other personnel. In one embodiment, the network may be another kind of network or combination of different types of networks, e.g., voice, data, emergency, etc. Thus, in accordance with the aforementioned examples, the visual information on the display 43 may be changed or updated based on the NFC antenna(s) that are tapped by user device including the NFC circuit, e.g., NFC reader.

In one embodiment, the content stored in memory 42 may be updated or changed on a periodic basis, for example, in order to ensure that the interactive poster is displaying the most current or relevant information. The update or change of information in memory 42 may be performed remotely through a network (e.g., via interface 44), on-site by a technician, or both.

In one embodiment, the controller 41 may change (e.g., based on stored instructions) the state of one or more antennas when a tap is received. For example, when a tap is received, the controller 41 may place some antennas in an active state or others in an inactive state, depending, for example, on stored instructions for the controller 41. Antennas may be considered to be in an active state when the controller 41 is programmed to display content and/or perform an operation when locations on a display screen corresponding to those antennas are tapped by with a user device including an NFC circuit. Antennas may be considered to be in an inactive state when the controller 41 is programmed to perform no content change or operation when tapped.

In one embodiment, tapping one or more active antenna may change the displayed content to correspond to different information or a second hierarchical level of content. In this case, the display controller 41 may activate one or more of the antennas that were previously inactive (e.g., inactive in a home display screen, previous display screen, or prior hierarchical level) to correspond to locations on the changed content that is displayed. Additionally, or alternatively, the display controller 41 may deactivate one or more antennas that were previously active at this time. In one embodiment, tapping one of the activate antennas may cause the activation and/or deactivation of one or more other antennas relative to the same displayed content.

In one embodiment, the active antennas may be made "visible" to a user by visually marking their locations, for example, with a specific icon or indicia. The markings may be displayed with content or may include be some type of external marking on the display screen. When the user device with an NFC circuit is placed within range of one or more antenna positions, the controller 41 may automatically detect the one or more tapped antenna positions and consequently select from memory 42 specific content (e.g., an image) to be displayed.

In one embodiment, all of the control and content display operations (e.g., all operations of the interactive poster) are performed based solely on power output from the power harvester 20, which obtains all of its input power from the electric field generated when the user device taps the display. In such an embodiment, the poster may not communicate with a remote server via a wired or wireless network, unless some additional power source is provided. Given these considerations, use of an e-paper display may be suitable for use in one embodiment, because this type of display has low-power requirements.

In one embodiment, the content displayed on the poster may include one or more images including advertisements. The advertisement images may be changed, for example, when a user device (including an NFC circuit) taps one or more antennas corresponding to the displayed advertisement images. Once the images are loaded into memory 42, no fixed power or specific infrastructure is required for operation of the poster. This avoids having to replace the visual medium if the advertised item becomes obsolete, an advertisement contract terminated, or an associated sale or event has passed, which replacement is required in the case of printed posters or displays. The interactive poster may vary in size, for example, depending on the application. In one case, the interactive poster may correspond to a device that is relatively smaller, e.g., an e-letter. In other cases, the interactive poster may have the size of a standard poster or even larger.

In one embodiment, the interactive poster may be applied to a gaming application. In this case, the interactive poster may provide a new gaming experience at little cost and complexity. For example, consider the case where the gaming application includes a chess game displayed on e-paper display 43. The displayed chess board may be altered, updated, or changed when tapped with a user device (including an NFC circuit) at locations corresponding to one or more antennas of the poster. For example, the tapping may change the displayed chess board to the board of another game, e.g., checkers. In one embodiment, additional taps may correspond to certain actions within a game, e.g., movement of a chess piece, etc.

Figure 2:
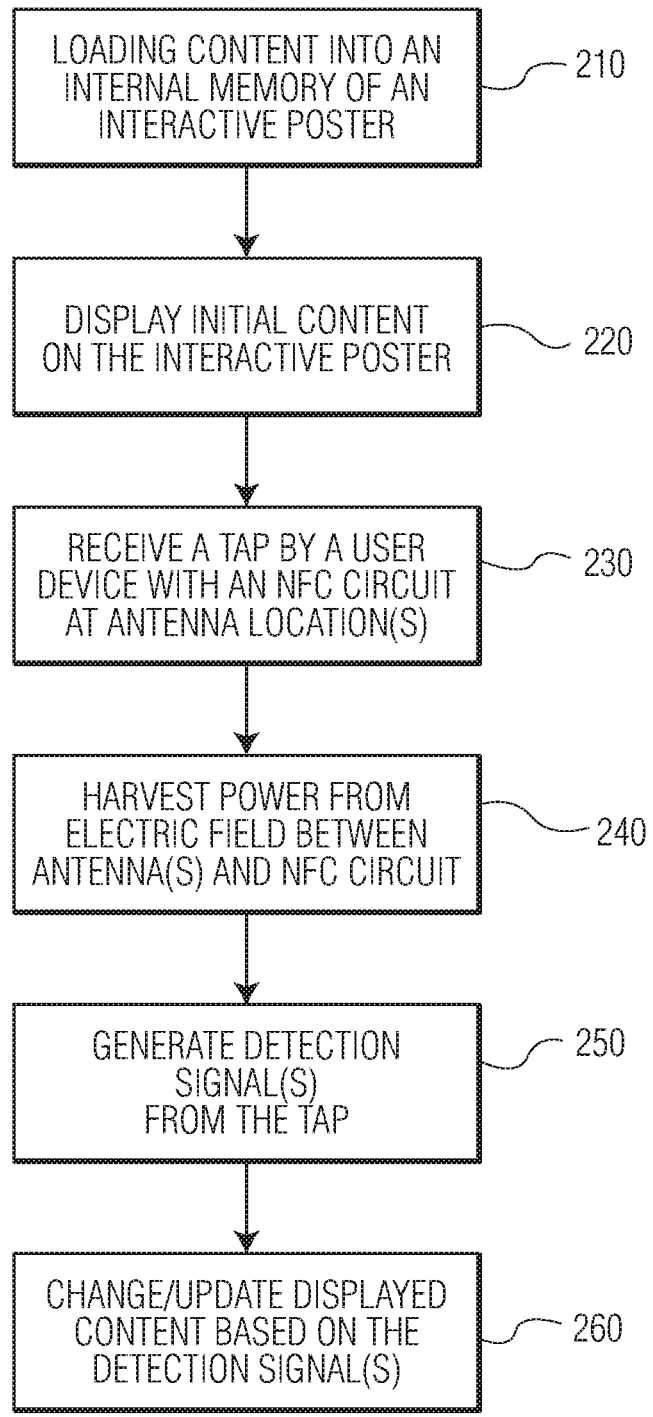
FIG. 2 illustrates an embodiment of a method for controlling an interactive poster.

FIG. 2 illustrates an embodiment of a method for controlling an interactive poster, which, for example, may correspond to the interactive poster of FIG. 1. The method includes, at 210, loading content into an internal memory of an interactive poster. As previously indicated, the content may include text, images, graphics, animations, video, audio, gifs, webpages, and/or other content. The content may be pre-loaded into the memory by a manufacturer and/or may be periodically loaded and/or changed remotely through a communications link or interface or in-person by a technician or operator through an appropriate interface, e.g., USB, SPI, I2C, or another interface. As previously discussed, the poster may or may not include its own power source. For illustrative purposes, the remaining operations of the method will be described based on the assumption that the interactive poster does not have its own power source and does not have access to any power source other than from the NFC circuit of the user device, e.g., power for operating the interactive poster comes from the NFC circuit of the user device.

At 220, the interactive poster displays initial content (e.g., visual information), which, for example, may be a home screen, some form of initial content stored in memory, or another type of information stored in the memory of the poster. The information may be advertising information, entertainment information, educational information, safety-related information, navigation/map information, and/or any other type of information which may be considered of interest to users. In one embodiment, the initial content may service, for example, as a screen saver or wall paper. In another embodiment, the initial content may play portions of main content that is to be accessed, displayed, or further described by content to be displayed on the interactive poster after the tap is received. Such information may include, for example, portions of a movie trailer.

Figure 5B:
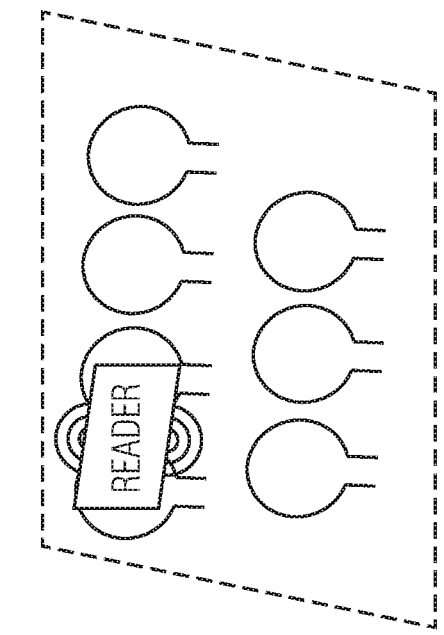
FIG. 5B illustrates an example of changing content when multiple antennas are simultaneously tapped.
Figure 5A:
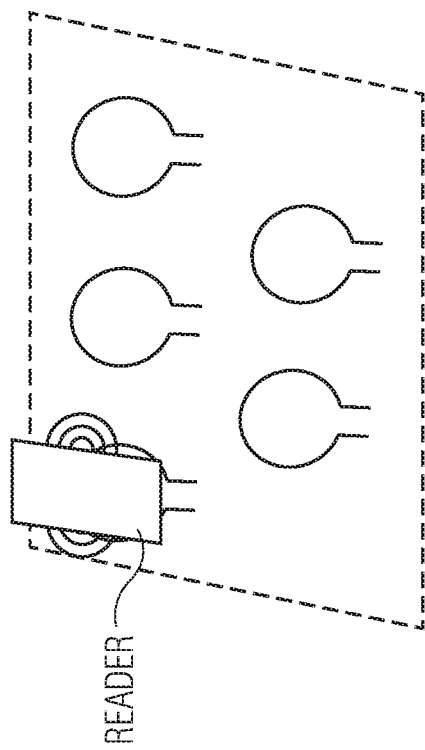
FIG. 5A illustrates an example of changing content when one antenna is tapped.

At 230, the interactive poster is tapped by a user device that includes an NFC circuit. The location of the tap corresponds to one or more antennas of the poster, as previously described. For example, FIG. 5A illustrates the case where a tap by a user device (including an NFC circuit, illustratively labeled NFC reader) overlaps only one antenna. FIG. 5B illustrates the case where a tap by a user device overlaps more than one of the antennas.

Figure 6:
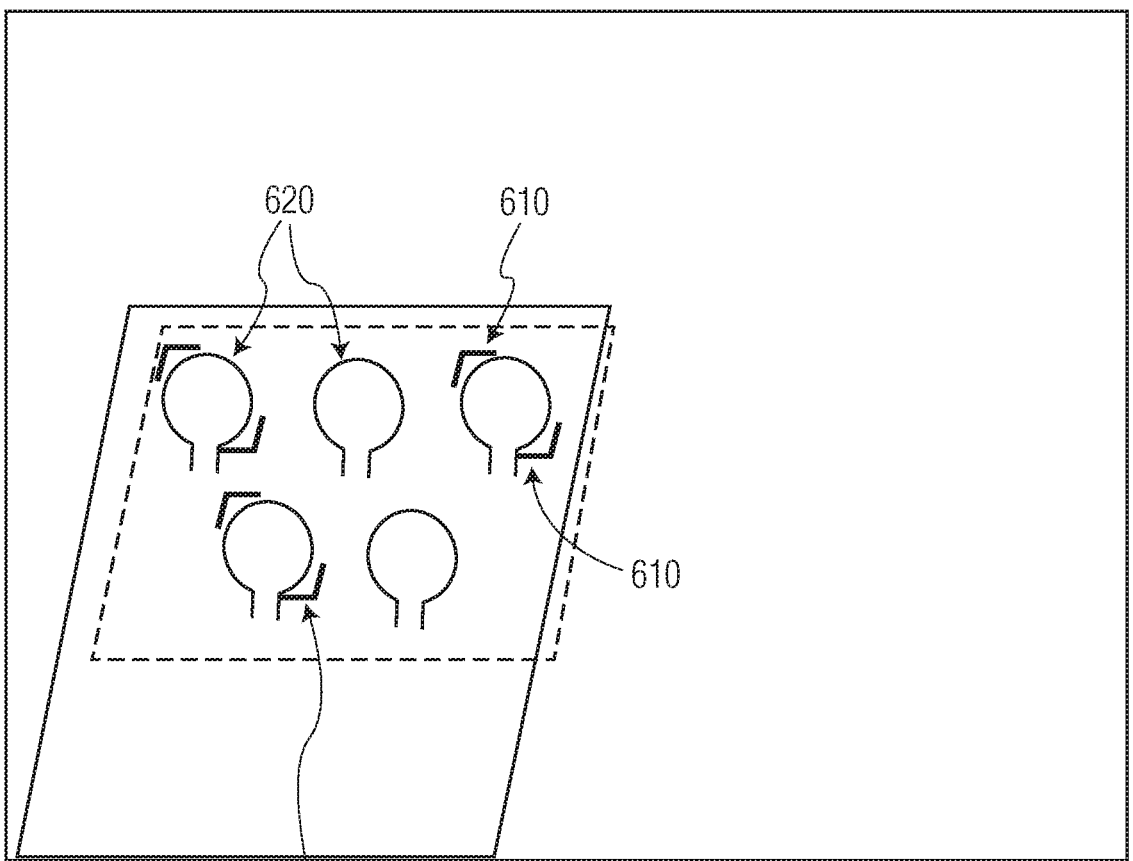
FIG. 6 illustrates an example of markings for guiding the tapping of antenna corresponding to selectable areas of a display.

To guide a user, the initial content as displayed may include one or more areas (corresponding to active antennas) that are indicated (e.g., with icons, arrows, text, images, graphics, and/or other indicia or visual information) to let a user know that these areas are "tappable" or "selectable," for purposes of accessing additional content or information or to change the content being displayed. FIG. 6 illustrates an example of where markings 610 are included on the display in association with corresponding antennas 620. The markings 610 may be printed on a protective cover of the display or displayed in a manner superimposed on or included with the content being displayed. In one embodiment, one or more other antennas of the interactive poster may be in an inactive state at any given time or all of the antennas may be in an active state, depending, for example, on the content being displayed and the instructions used to program the controller 41.

At 240, once a tap is received, the power harvester 20 in the interactive poster generates power based on an electric field generated based on interaction between the antenna(s) and the NFC circuit in the user device that tapped the poster. In one embodiment, the power output from the power harvester 20 is the only power used to control operations of the poster.

At 250, one or more detection signals are generated based on the antenna(s) that were tapped. The detection signal(s) may be generated by the power detection section 30 based on a comparison of the level(s) of those signal(s) to a reference value. The detection signals are then input into the display controller.

At 260, the controller 41 performs one or more operations and/or displays updated or changed content based on corresponding ones of the detection signals. For example, each detection signal of the full set or a subset of all available detection signals (or a combination of detection signals) may be mapped to a specific operation and/or update/change of content to be displayed. The mapping may be implemented based on instructions, routines, programs, and/or other information stored in an internal memory of the poster. The controller 41 may retrieve the updated or changed content from memory and then output the content for display. To save power, the display may be an e-paper display, but may be a different kind of display in another embodiment. In one embodiment, control may return to operation 230 after operation 260. In this case, the system will not step after operation 260 but will loop back to operation 230 to await receipt of another tap.

Figure 3:
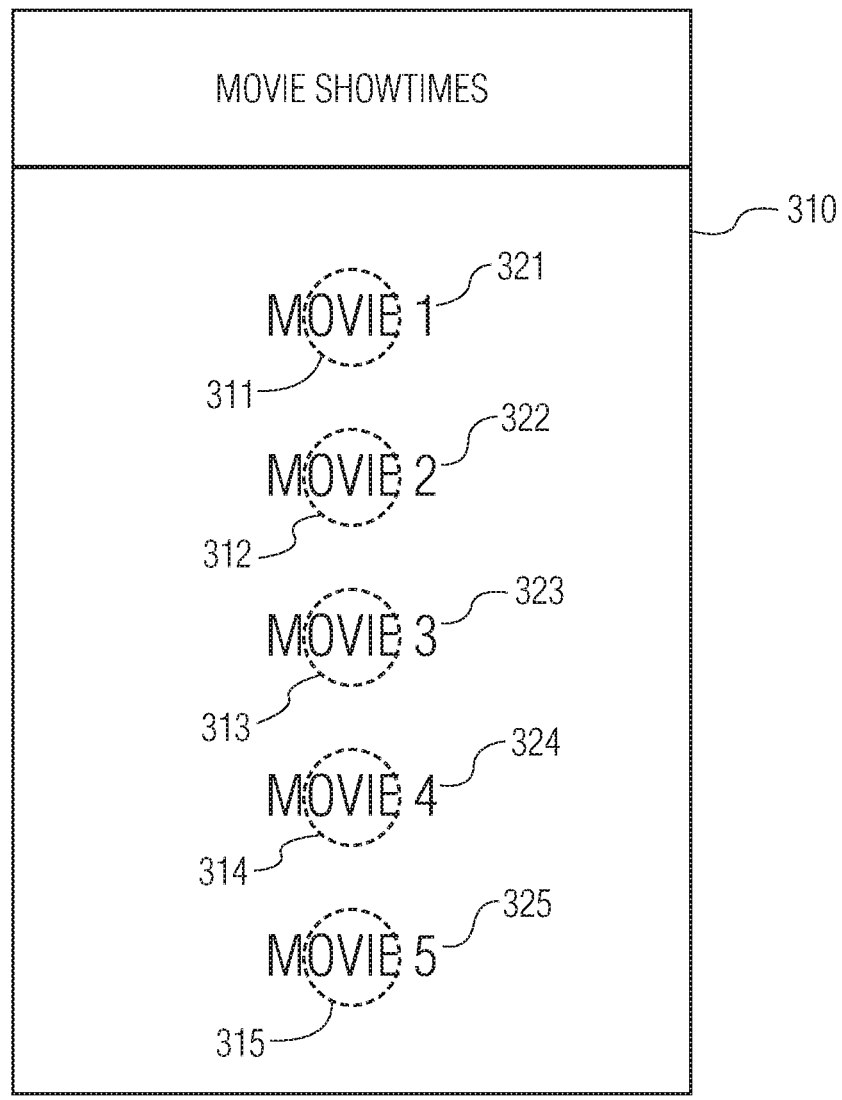
FIG. 3 illustrates an example arrangement of antennas relative to displayed content.
Figure 7:
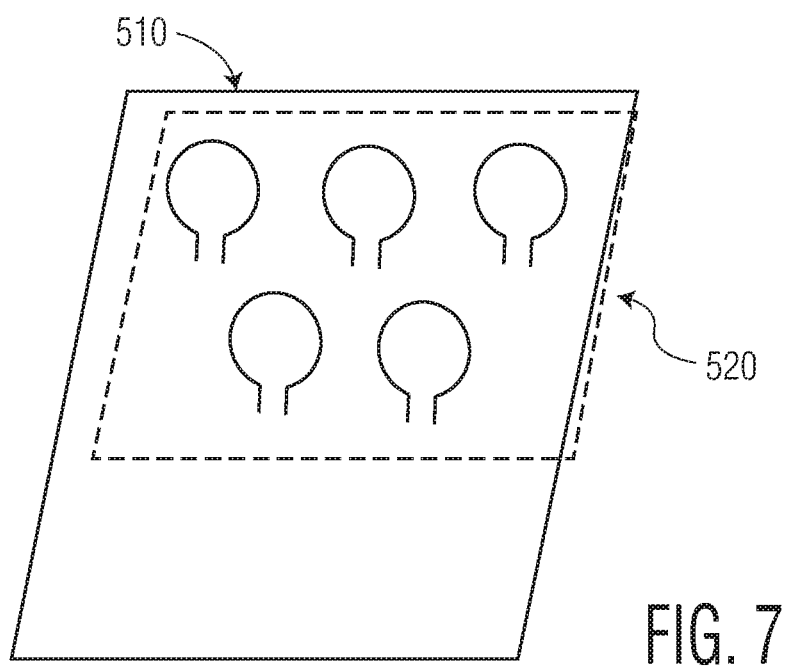
FIG. 7 illustrates an example arrangement of antennas relative to a display.

FIG. 3 illustrates an example arrangement of antennas that may be included in the interactive poster. In this example, the interactive poster may be located, for example, in a public place to display information relating to movies showing at a particular theater. The antennas are mounted at predetermined locations behind a display surface (e.g., see also FIG. 7). In one embodiment, reference numeral 310 may correspond to the front surface (e.g., screen) of the display, and an arrangement of antennas behind or below the display screen. Each predetermined location may correspond to a certain item of content (e.g., in this case the name of a movie) on the poster. For example, a first antenna 311 is located behind an area 321 displaying the name of Movie 1, a second antenna 312 is located behind an area 322 displaying the name of Movie 2, a third antenna 313 is located behind an area 323 displaying the name of a Movie 3, a fourth antenna 314 is located behind an area 324 displaying the name of a Movie 4, and a fifth antenna 315 is behind an area 325 displaying the name of a Movie 5.

When a user device taps on an area including the name (or a portion of the name) of one of the movies on the display surface, the antenna(s) corresponding to that name interacts with the NFC circuit in the user device, for example, to change all or a portion of the information being displayed. For example, when a user taps on the area corresponding to Movie 1 (e.g., first content) with a user device including an NFC circuit, showtimes (e.g., second content) 330 for Movie 1 may be automatically displayed on all or a corresponding portion of the display surface, as illustrated, for example, in FIG. 4. In this case, antennas 311 that was previously in an active state is still in an active state after the tapping. However, the displayed content corresponding to antenna 311 has now changed to one of the showtimes. Also, two additional antennas 331 and 332 that were previously in an inactive state are activated by controller 41 to correspond to a respective number of additional showtimes.

Figure 4:
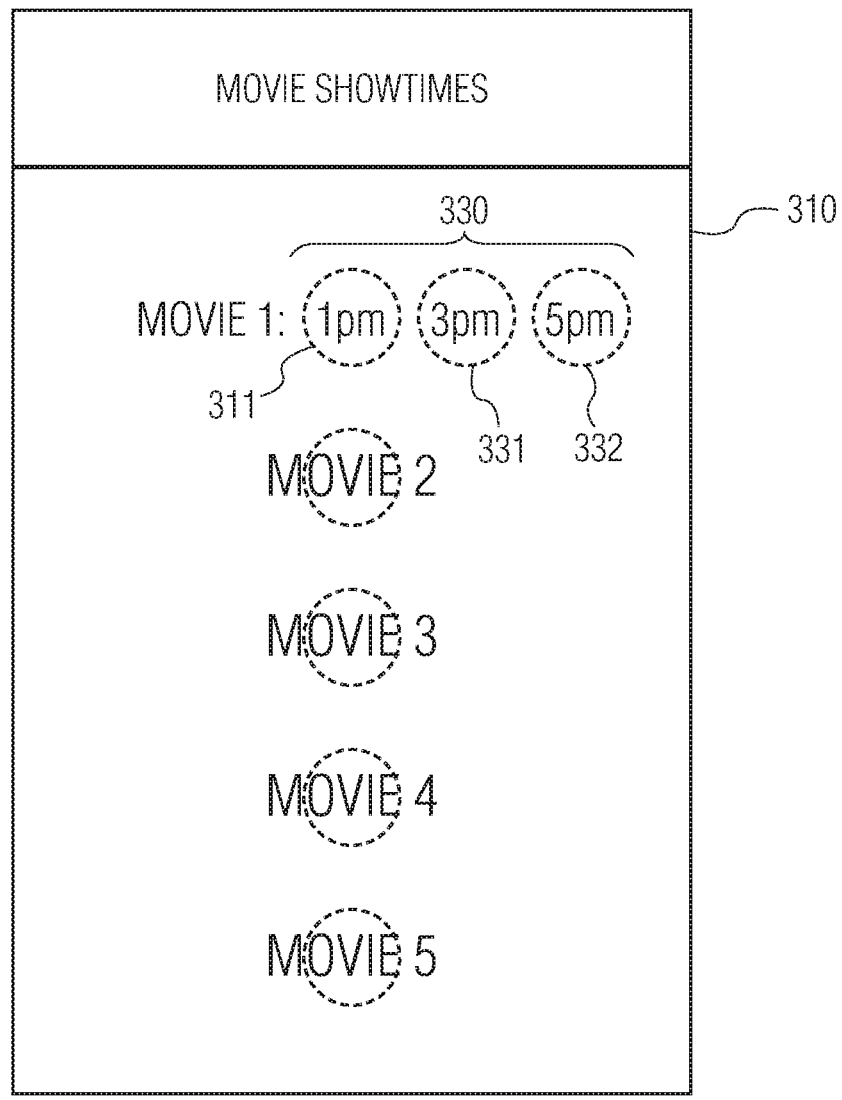
FIG. 4 illustrates an example of how content may be changed when an antenna is tapped.

In FIGS. 3 and 4, the antennas are dotted to indicate that they are behind the display 43 or its front surface (e.g., screen). In one embodiment, the antenna may be integrated into the display screen, for example, at a location between the transparent layer passing light and the pixels and/or driver circuits of the display. Also, in one embodiment, the display sub-system, power detection section, and/or power harvester may be in separate chips or may be combined into a single chip.

Figure 8:
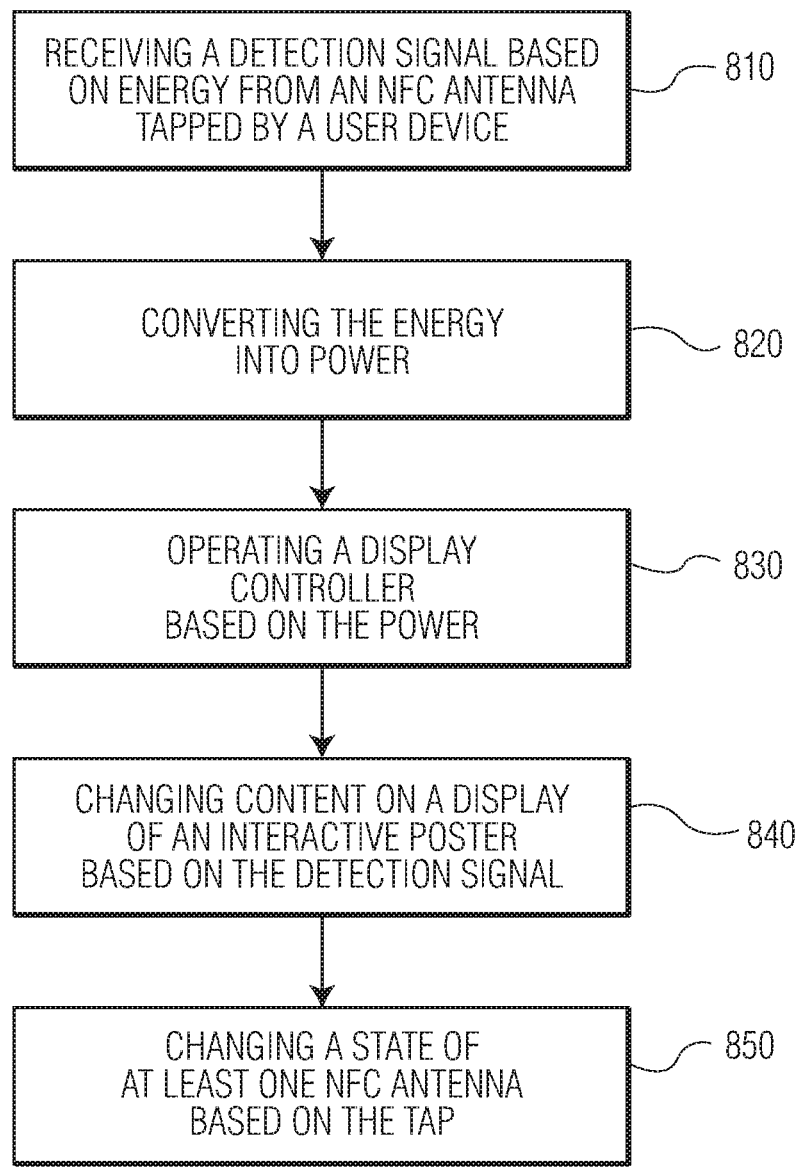
FIG. 8 illustrates another embodiment of a method for controlling an interactive poster.

FIG. 8 illustrates an embodiment of a method for controlling an interactive poster. This method may be performed in accordance with any of the previous embodiments described herein, or by a different device or system.

At 810, the method includes receiving a detection signal based on energy from a first near-field communications (NFC) antenna. The NFC antenna may correspond, for example, to any of the antennas 11, 12, and 13 in FIG. 1 and the detection signal may be generated by the power detection section 30 illustrated in this figure. The detection signal may be generated based on energy received by a user device including an NFC circuit, at a time when the user device taps one or more of the antennas.

At 820, the energy received by the tapped antenna is converted into power for the display controller of the antenna. The conversion may be performed by the power harvester 20 of the interactive poster. The converted power may also be supplied to the power detection section 30 and a display, e.g., display 40. In one embodiment, the harvested power may power all of the operations of the interactive poster relating to changing the displayed content. In another embodiment, back-up or supplemental power (e.g., from a battery, a solar power source, USB or other connector power, etc.) may be used to support operations of the interactive poster.

At 830, the converted power is supplied to the display controller 41, the memory 42, and the display (e.g., e-paper) 43. For example, this power may be used by the display controller to access content and/or other information from the memory in order to perform one or more operations.

At 840, content on the display is changed by the display controller 41 based on the detection signal generated when the user device taps one or more of the NFC antennas. For example, the detection signal may be generated when the NFC antenna taps a first position that corresponds to display of first content. In this case, operation 840 may include changing display of the first content to second content retrieved from the memory. The change of content may be performed based on which antenna the detection signal is generated from, based on instructions, routines, programs, or other stored information indicating relationships between content changes and/or operations to be performed by the display controller and different ones or combinations of the antennas that are tapped at the same time. The change of content or operations performed may be any of those previously described herein.

At 850, the method may additionally include changing the state of the first NFC antenna and/or one or more other NFC antennas of the interactive poster when one or more of the NFC antennas are tapped. The state change may include changing one or more of the NFC antennas from an active state to an inactive state or an inactive state to an active state. The change of state may be determined, for example, based on the second content to be displayed in response to the tap and/or other information indicated by the instructions, routines, programs, etc. In one embodiment, operation 850 may be optional. Also, in one embodiment, control may return to operation 810 after operation 850 or 840 is performed along a loop-back path.

The controllers, detectors, harvesters, regulators, interfaces, comparators, and other signal-generating and signal-processing features of the embodiments disclosed herein may be implemented in logic which, for example, may include hardware, software, or both. When implemented at least partially in hardware, the controllers, detectors, harvesters, regulators, interfaces, comparators, and other signal-generating and signal-processing features may be, for example, any one of a variety of integrated circuits including but not limited to an application-specific integrated circuit, a field-programmable gate array, a combination of logic gates, a system-on-chip, a microprocessor, or another type of processing circuit.

When implemented in at least partially in software, the controllers, detectors, harvesters, regulators, interfaces, comparators, and other signal-generating and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. An interactive poster, comprising:
a first near-field communications (NFC) antenna;
a first memory configured to store first content;
a controller configured to control operation of a display; and
a power harvester configured to output power based only on energy received by the first NFC antenna, wherein the first NFC antenna is located at a first position and wherein the controller is configured to change display of first content to second content directly in response to the first NFC antenna being tapped by a user device including an NFC circuit,
wherein the output power by the power harvester solely powers the controller, the first memory, and the display, the display being an e-paper display.

2. The interactive poster of claim 1, wherein:
the first content is a first type of media data; and
the second content is a second type of media data different from the first type of media data, the first type of media data and the second type of media data selected from the group consisting of text data, image data, video data, graphics data, and animation data.

3. The interactive poster of claim 1, further comprising:
a second NFC antenna at a second position,
wherein the controller is configured to change display of the first content to the third content when only the first NFC antenna and the second NFC antenna are simultaneously tapped by the user device.

4. The interactive poster of claim 1, further comprising:
a second NFC antenna at a second position,
wherein the controller is configured to change display of third content to fourth content when the second NFC antenna is tapped by the user device.

5. The interactive poster of claim 4, wherein controller is configured to display the first content and the third content simultaneously.

6. The interactive poster of claim 4, wherein the controller is configured to display the second content and the fourth content at different times.

7. The interactive poster of claim 4, further comprising:
a first power detector configured to generate a first detection signal when the first NFC antenna is tapped, and
a second power detector configured to generate a second detection signal when the second NFC antenna is tapped, wherein the controller is configured to control display of the second content based on the first detection signal and to control display of the fourth content based on the second detection signal.

8. The interactive poster of claim 1, further comprising:
a second memory configured to store information linking the first content and the second content, wherein the controller is configured to access the information to change display of the second content when the first NFC antenna is tapped by the user device.

9. The interactive poster of claim 1, further comprising:
a second NFC antenna at a second position, wherein the first NFC antenna is in an active state and the second NFC antenna is in an inactive state, wherein the first NFC antenna in the active state change display of first content to second content when tapped and the second NFC antenna in the inactive state performs no content change when tapped.

10. The interactive poster of claim 9, wherein the controller is configured to change the first NFC antenna from the active state to an inactive state when the first NFC antenna is tapped by the user device and the controller is configured to change the second NFC antenna from the inactive state to an active state when the first NFC antenna which is active is tapped by the user device.

11. The interactive poster of claim 10, wherein the second NFC antenna corresponds to display of third content when the second NFC antenna is in the active state.

12. An interactive poster, comprising:
a first memory area configured to store instructions;
a plurality of near-field communications (NFC) antennas;
a controller configured to control a display based on the instructions; and
a power harvester configured to output power for the controller, wherein the controller is configured to change display of first content to second content directly in response to a signal generated when a first near-field communications (NFC) antenna is tapped with a user device including an NFC circuit, the controller to change display of the first content to the second content based on information linking the first NFC antenna to a first selectable area of the first content, and the power harvester configured to output power based only on energy received by the first NFC antenna, wherein the output power by the power harvester solely powers the controller, the first memory, and the display, the display being an e-paper display.

13. The interactive poster of claim 12, wherein the controller is configured to change display of the first content to third content based on a signal generated when a second NFC antenna is tapped with the user device, the controller to change display of the first content to the third content based on information linking the second NFC antenna to a second selectable area of the first content.

14. The interactive poster of claim 12, wherein:
the first content is a first type of media data; and
the second content is a second type of media data different from the first type of media data, the first type of media data and the second type of media data selected from the group consisting of text data, image data, video data, graphics data, and animation data.

15. The interactive poster of claim 12, wherein the controller is configured to change display of the first content to the third content when the first NFC antenna and a second NFC antenna corresponding to the display are tapped simultaneously by the user device.

16. The interactive poster of claim 12, wherein the controller is configured to change a state of at least one of the plurality of NFC antennas when the first NFC antenna is tapped by the user device.

17. A method for controlling an interactive poster, comprising:
receiving a detection signal based on energy from a first near-field communications (NFC) antenna;
converting, by a power harvester, only the energy received by the first NFC antenna into power; and
changing content on a display of the interactive poster directly in response to the detection signal,
wherein the first NFC antenna is located at a first position, wherein changing the content on the display includes changing display of first content to second content, and wherein the first NFC antenna is tapped by a user device including an NFC circuit, the content change performed by a controller operating based on the converted power, wherein the converted power from the power harvester solely powers the controller, the first memory, and the display, the display being an e-paper display.

18. The method of claim 17, further comprising:
changing a state of a second NFC antenna located at a second position,
wherein the state of the second NFC antenna changed when the first NFC antenna is tapped by the user device.

19. The method of claim 18, further comprising changing a state of the first NFC antenna when the first NFC antenna is tapped by the user device.

20. The interactive poster of claim 1, wherein a location of the first NFC antenna is visible to the user by a marking in the displayed first content, the marking being an out line defining boundaries of the first NFC antenna.

21. The interactive poster of claim 20, wherein the outline is a dotted line.

* * * * *